United States Patent
Ng et al.

(10) Patent No.: US 6,918,330 B2
(45) Date of Patent: Jul. 19, 2005

(54) ADJUSTABLE TOOL STATION

(75) Inventors: Alison Ng, New York, NY (US); Eric Kim, Flushing, NY (US); Frank Dalessandro, Bayside, NY (US)

(73) Assignee: Thomson Industries, Inc., Port Washington, NY (US)

( * ) Notice: Subject to any disclaimer, the term of this patent is extended or adjusted under 35 U.S.C. 154(b) by 0 days.

(21) Appl. No.: 10/146,106

(22) Filed: May 15, 2002

(65) Prior Publication Data

US 2003/0056632 A1 Mar. 27, 2003

Related U.S. Application Data

(63) Continuation-in-part of application No. PCT/US01/50897, filed on Oct. 24, 2001.
(60) Provisional application No. 60/242,850, filed on Oct. 24, 2000.

(51) Int. Cl.[7] .......................... B23D 45/02; B27B 5/20; B27B 5/36; B26D 1/16; B26D 5/08
(52) U.S. Cl. ..................... 83/471.3; 83/473; 83/477.1; 83/486.1; 83/490; 83/581; 83/821; 83/699.61; 384/43
(58) Field of Search ................................ 384/428, 438, 384/43–49; 83/581, 490, 471.3, 486.1, 485–489, 821, 824, 825, 473, 471.2, 477.1, 699.61

(56) References Cited

U.S. PATENT DOCUMENTS

| | | | | |
|---|---|---|---|---|
| 3,540,499 A | * | 11/1970 | Sheps ........................ | 83/471.3 |
| 3,545,826 A | * | 12/1970 | Magee et al. ................ | 384/43 |
| 3,565,137 A | | 2/1971 | Alsruhe | |
| 3,767,276 A | * | 10/1973 | Henn .......................... | 384/43 |
| 3,951,472 A | * | 4/1976 | Schurger et al. ............. | 384/43 |
| 4,152,961 A | | 5/1979 | Batson | |
| 4,257,297 A | | 3/1981 | Nidbella | |
| 4,817,581 A | * | 4/1989 | Trentadue ................... | 125/14 |
| 4,934,834 A | * | 6/1990 | Morita ....................... | 384/45 |
| 5,060,548 A | | 10/1991 | Sato et al. | |
| 5,146,825 A | | 9/1992 | Dehari | |
| 5,216,964 A | | 6/1993 | Sato et al. | |
| 5,221,145 A | * | 6/1993 | Borel ......................... | 384/43 |
| 5,239,906 A | | 8/1993 | Garuglieri | |
| 5,241,888 A | * | 9/1993 | Chen .......................... | 83/471.3 |
| 5,245,904 A | * | 9/1993 | Meyerle ...................... | 83/529 |
| 5,346,313 A | * | 9/1994 | Ng ............................. | 384/43 |
| 5,513,548 A | | 5/1996 | Garuglieri | |
| 5,524,516 A | * | 6/1996 | Sasaki et al. ............... | 83/471.3 |
| 5,531,147 A | | 7/1996 | Serban | |
| 5,582,089 A | * | 12/1996 | Sasaki et al. ............... | 83/471.3 |
| 5,613,780 A | * | 3/1997 | Ng ............................. | 384/43 |
| 5,768,967 A | * | 6/1998 | Sasaki et al. ............... | 83/471.3 |
| 5,819,624 A | * | 10/1998 | Brault et al. ................ | 83/471.3 |
| 5,829,882 A | * | 11/1998 | Ng et al. ..................... | 384/43 |
| 5,862,732 A | | 1/1999 | Itzov | |
| 5,896,798 A | | 4/1999 | Garuglieri | |
| 6,035,754 A | | 3/2000 | Stumpf et al. | |
| 6,067,885 A | | 5/2000 | Brunson et al. | |
| 6,289,778 B1 | | 9/2001 | Wixey | |

FOREIGN PATENT DOCUMENTS

| | | |
|---|---|---|
| DE | 3503 027 | 10/1985 |
| DE | 4409540 | 11/1994 |
| WO | 99/25983 | 5/1999 |

* cited by examiner

Primary Examiner—Boyer D. Ashley
(74) Attorney, Agent, or Firm—Dilworth & Barrese LLP (57) ABSTRACT

A miter saw includes a tool adjustment unit having a joint pivotable about an axis, a guide rail spaced from and coupled to the joint so as to pivot about the axis, a saw housing mounted on the guide rail and a linear motion bearing assembly, which is positioned between the guide rail and the saw housing. The guide rail and the linear motion bearing are so shaped and dimensioned that the saw housing and the guide rail rotationally engage one another in a substantially play free manner to displace a saw blade between a plurality of angled positions.

9 Claims, 8 Drawing Sheets

ADJUSTABLE TOOL STATION

CROSS-REFERENCE TO RELATED APPLICATIONS

The present application is a continuation-in-part of International Application No. PCT/US01/50897, filed Oct. 24, 2001, which claims the benefit of U.S. Provisional Application No. 60/242,850, filed on Oct. 24, 2000.

FIELD OF THE INVENTION

The present invention relates to an adjustable tool station. More particularly, the invention relates to a guide assembly rotatably engaging a tool head in a substantially play-free manner to prevent rotation of the tool head.

BACKGROUND OF THE INVENTION

Numerous power hand tools assisting a user in accomplishing a variety of tasks are known. Generally, such tools include a base and a tool head for performing a certain task, for example, cutting and/or sawing a workpiece composed of wood, plastic, metal or other various materials. Typically, a saw assembly includes a blade and various actuators adapted to displace the blade linearly along a longitudinal axis, rotate the blade about the longitudinal axis in various angled or beveled positions, and/or displace the blade along a pivot axis extending perpendicular to the longitudinal axis.

Examples of such a saw assembly include compound miter/chop saws allowing the user to selectively move the saw blade into any of a number of positions for square cutting, miter cutting, bevel cutting, or compound miter cutting where a combination miter angle and bevel angle are cut. In addition, it is essential that the saw blade move linearly to accommodate different lengths of the workpiece. In order to allow for the adjustment of the miter and the bevel angle, the saw blade, cutter or other working device can move along a horizontal base across the workpiece. Subsequently, if an angular adjustment of these elements is desirable, the bevel adjustment allows the saw blade, cutter or other working device to be positioned at an angle with respect to the horizontal base. At times it may be desired to cut a combination miter angle and bevel angle by simultaneously adjusting the angle of the blade with respect to both the horizontal base and a vertical guard.

Once the saw blade, cutter or other working device has been adjusted to the desired position with respect to the horizontal base and the vertical fence, locking mechanisms for the miter and bevel adjustment must be activated in order to prohibit movement of the saw blade, cutter or other working device from the set position with respect to the base and fence while the cutting operation is performed. These locking mechanisms need to be easily activated, adjustable and quick acting in order to optimize the efficiency of the cutting apparatus and provide convenience to the operator of the apparatus.

Figure 1:
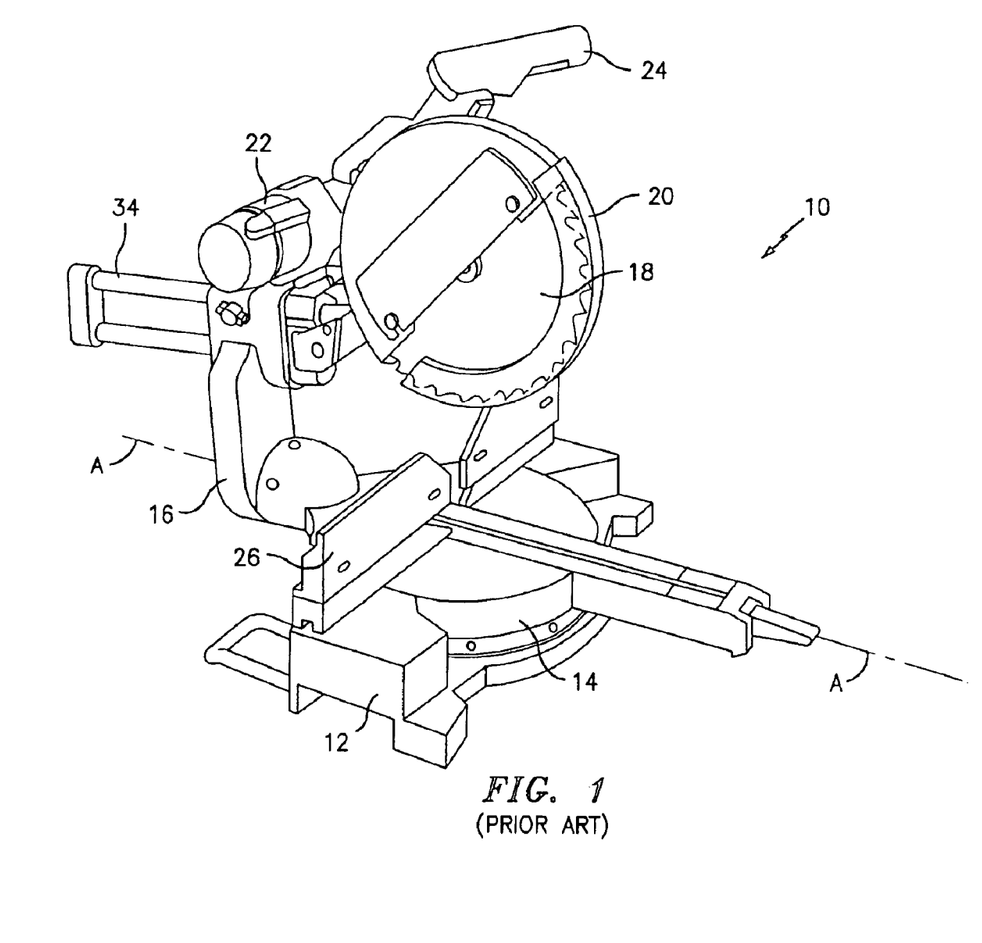
FIG. 1 is a front perspective view of a sliding compound miter/chop saw in accordance with the prior art.

A typical saw assembly of the type, as discussed above, is disclosed in U.S. Pat. Nos. 6,035,754; 5,907,987; 5,870,938; and 5,870,838. As shown in FIG. 1, sliding compound miter saw 10 disclosed in the above-mentioned patents includes a base 12, a table 14, a housing 16, a saw blade 18, a blade guard 20, a motor 22 drivingly connected to saw blade 18, a handle 24 and a guard 26. The table assembly 14 is secured to the base 12 such that it can be rotated in order to provide adjustment for miter cutting. The housing 16 is secured to the table 14 such that it can be pivoted to adjust the angle of the saw blade 18 relative to table 14 for bevel cutting. To provide linear movement of a saw head consisting of the saw blade 18, the motor 22, the handle 24 and the blade guard 20 relative the table 14, the housing 16 has two support arms 34 coupled with the saw for synchronous sliding movement. The sliding movement of support arms 34 drives the housing 16 and the saw blade 18 so that the saw blade can be pulled through the workpiece when the size of the workpiece exceeds the cutting width of the saw blade 18.

A fairly complicated combination of movements can be inconvenient for the user operating the miter saw 10. First, displacement of support arms 34 attached to the saw head for synchronous linear displacement therewith to an initial position, in which the saw blade 18 is located next to the guard 26, increases the overall size of the saw. A portable tool design, like the miter/chop saw discussed here, requires that such a tool be compact.

Still another disadvantage of the above-disclosed miter saw may be observed during angular displacement of the saw blade between numerous angular positions which may be accompanied by undesired rotation of the saw head relative to the support arms. To minimize undesired rotation, many prior-art references including those discussed above disclose a two-arm support and guide system. Arms 34 can be positioned relative to one another either in a vertical or a horizontal plane.

The vertical arrangement of the arms, as disclosed in the cited patents, minimizes undesired rotation of a saw head until the saw head reaches a 40–45° angular position. In this position, the upper arm supports some of the load of the saw head and rubs against a plain bushing supporting this arm, which, in turn, causes drag. In the horizontal arrangement, both arms always support the load of the saw head and, thus, the drag problem manifests itself at an angle smaller than a 45° angle.

It is, therefore, desirable to provide a compact, light and simple structure saw assembly of the type described above. Also, the saw assembly having a structure with minimized play between a saw head, which includes the saw blade, its housing and other parts fixed to the blade for synchronous angular displacement therewith, and a support and guide system is also desirable.

SUMMARY OF THE INVENTION

An improved structure of a portable power tool, such as a miter/chop saw, having a reduced overall size and reliable engagement between angularly displaceable parts is attained in accordance with the present invention.

In accordance with one aspect of the invention, a saw housing receiving a saw blade is linearly guided along a guide rail, which is not linearly displaceable along with the saw housing. As a consequence, the overall size of the power tool is reduced.

Another aspect of the present invention is directed at minimization of undesirable play between a guide rail and a saw housing during angular displacement of the entire system. To attain this, the guide rail is shaped to mesh with a linear motion bearing segment which is fixed to the saw blade housing. The linear motion bearing segment has a plurality of self-contained roller or ball retainer segments arranged so that the bearing segment and the guide rail engage one another in a substantially play-free manner during pivotal displacement of the miter saw between beveled or angled positions of a saw blade.

As a consequence, the inventive single guide rail eliminates one shaft or arm of the support system along with a respective plain bushing disclosed by the above-discussed prior art. Furthermore, as a result of the bearing segment and a shape of the guide rail preventing undesired torsional motion of structural components relative to one another, the inventive system is characterized by reduced drag.

BRIEF DESCRIPTION OF THE DRAWINGS

The above and other objects, features and advantages will become more readily apparent from a specific description of the preferred embodiments accompanied by the following drawings, in which:

FIG. 3B is an exploded perspective view of a half bearing segment of a linear motion bearing segment and a guide rail;

FIG. 3C is a perspective view of the assembled linear motion bearing segment supporting the guide rail in accordance with the present invention;

FIG. 4A is a diagrammatic cross-sectional view of an alternative embodiment of the guide rail in accordance with the invent, on;

DETAILED DESCRIPTION OF THE PREFERRED EMBODIMENTS

Referring now to the drawings, in which like reference numerals designate corresponding parts throughout the several views, FIGS. 2 and 5–7 illustrate a compound miter/chop saw 10 incorporating a support and guide assembly 30 in accordance with the present invention.

The compound miter/chop saw 10 includes a single guide rail 40, which is mounted on the table 14 so that the guide rail 40 does not move linearly along an axis A—A, and a saw housing 38 slidable along the guide rail 40. Linear displacement of the saw housing 38 into a position shown in FIG. 5 along the axis A—A is necessary when a workpiece to be sawed has a substantial size exceeding the diameter of the saw blade 18.

The compound miter/chop saw 10 further includes a rotatable joint 48 mounted rotatably about an axis A—A on the table 14 and a guide rail housing 68 rigidly coupled to the rotatable joint 48 by means of an arm 66 (FIG. 6) for synchronous pivotal motion around the axis A—A. The guide rail housing 68 receives an end 42 (FIG. 3B) of the guide rail 40 and engages it so that the guide rail housing 68 and guide rail 40 are rotationally and linearly fixed relative to one another. The guide rail 40, as shown in FIGS. 2–7, has an annular shape provided with a spline 58 (FIGS. 2, 3 and 5–7), and guide rail 40 engages a recess or nest 108 (FIG. 5) which has an inner surface formed complementary to the spline 58. The nest 108 of the guide rail housing 68 and the spline 58 engage one another so that there is no rotational or linear displacement between the guide rail housing 68 and the guide rail 40. Note that any arrangement rotationally and linearly fixing the guide rail housing 68 to the guide rail 40 can be used depending on a shape of the guide rail 40, which, for example, can be cross-like, I-beam, regular or irregular polygonal or annular.

Figure 2:
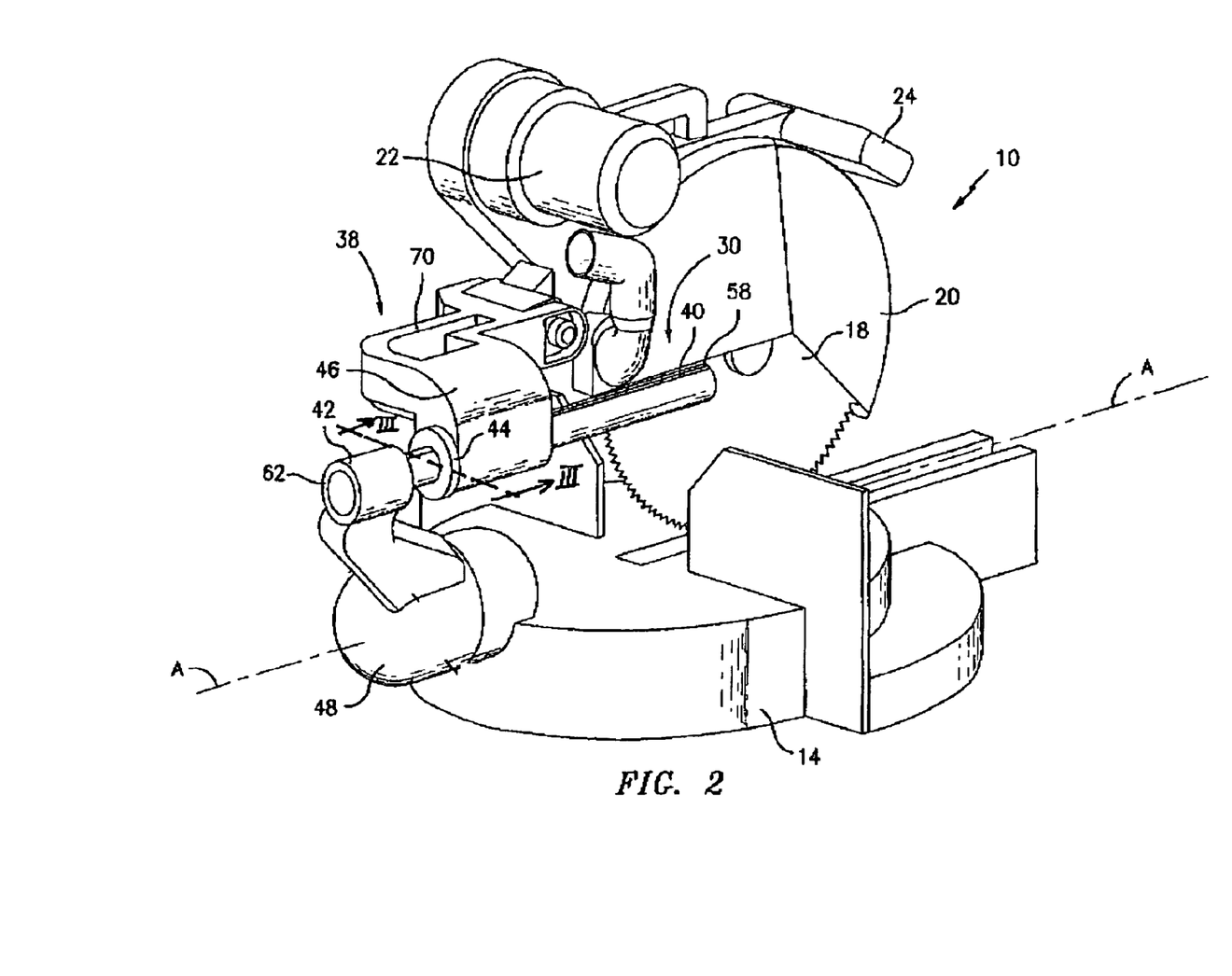
FIG. 2 is a perspective view of the sliding compound miter/chop saw in accordance with the invention and illustrated an initial position of the meter saw.

Linear displacement of the saw housing 38 along the guide rail 40 is provided by means of a linear motion ball bearing assembly 44 (FIGS. 3A–3C), which is disclosed in a co-pending application Ser. No. 60/242,850 and fully incorporated herein by reference. In particular, the ball bearing assembly 44 is fabricated from a plurality of individual arcuate interengageable self-contained rolling element retainer segment. A cross sectional view seen in FIG. 3A and taken along lines III—III of FIG. 2, illustrates a combination of the rolling element bearing segment assembly 44 mounted within a bore provided in an end 73 (FIGS. 3C and 5) of a Z-shaped lever 70 of the saw housing 38 and interengaged with the guide rail 40. Two individual quarter arcuate self-contained rolling element retainer segment 52 and a single half arcuate self-contained ball retainer segment 54, which constitute the bearing segment assembly 44, are supported in interengageable association with the end 73 of the Z-shaped lever 70 of the saw housing 38. A longitudinal groove 102 (FIG. 3C) is formed along an inner surface of the bored end 73 of the saw housing 38 for engaging the half arcuate retainer segment 54. When fully assembled, the quarter arcuate retainer segments 52 and the half arcuate retainer segment 54 are adapted and configured to move linearly smoothly on the guide rail 40, along with the saw housing 38. Note that a number of segments can vary.

The half arcuate ball retainer segment 54 includes a base portion 63 (FIG. 3B) having an inner surface configured and adapted to be in substantial clearance of the spline 58 formed along a longitudinal length of the guide rail 40. The base portion 63 includes a pair of independent ball bearing tracks 80 formed therein for retaining a plurality of rolling elements, which includes balls or rollers 56. Each rolling element bearing track 80 is made up of a load bearing portion 57 (FIG. 3A) and a return portion 59 interconnected by turnarounds 84 (FIG. 3B) for recirculating the balls or rollers 56 therealong during linear displacement of the saw housing 38 along the guide rail 40. The respective load bearing portions 57 are located adjacent to one another and are spaced from one another along the base portion 63 (FIG. 3B).

The half arcuate rolling element retainer segment 54 further includes a single load bearing plate 86 having an inner surface, which is configured and adapted to be disposed over both load bearing portions 57 of each ball bearing track 80, and an outer surface defining a pair of longitudinally extending convergent flat portions 88. Each convergent flat portion 88 is configured and adapted to engage a respective biasing member 90, which can be any resilient element, such as a spring. In addition, the half arcuate ball retainer segment 54 includes a pair of lids 92 and 94 serving to close the half arcuate ball retainer segment 54. Each lid is provided with a window 96 aligned with one of the convergent segment 88 and through which windows 88 the biasing members 90 extend to contact the inner surface of the end 73 of the saw housing 38, as shown in FIG. 3C.

Figure 6:
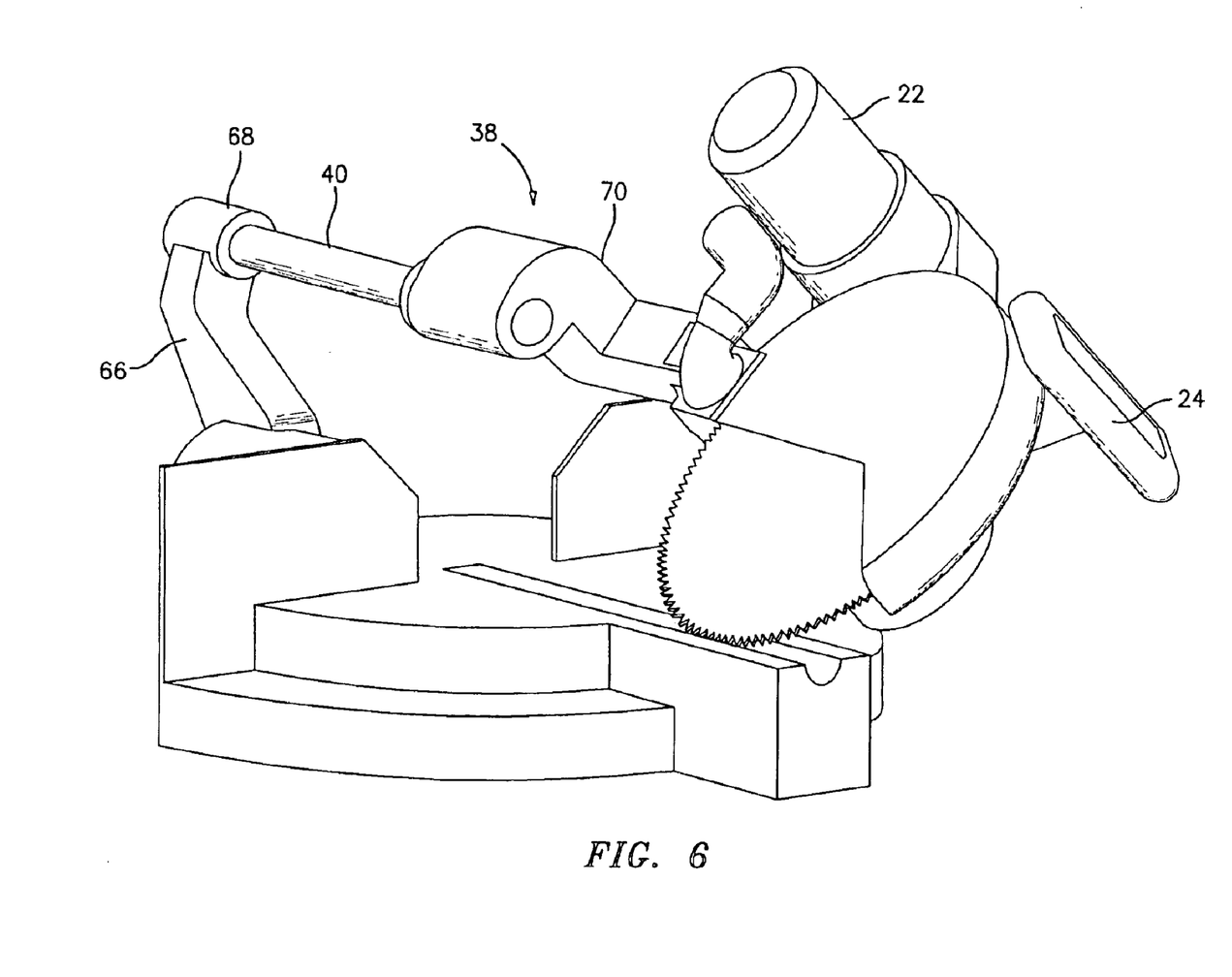
FIG. 6 is a perspective view of the sliding compound miter/chop saw shown in FIG. 2 and illustrated in an angled position of the saw blade.

To displace the saw blade 18 between a plurality of beveled or angled positions, as shown in FIG. 6, the arm 66, the guide rail housing 68, the guide rail 40 and the saw housing 38 pivot about the axis A—A as the rotatable joint 48 rotates about this axis (FIG. 2). Interengagement between the guide rail 40, the linear motion bearing segment assembly 44 and the end 73 of the Z-shaped lever 70 of the saw housing 38 prevents undesired angular displacement between the saw housing 38 and the guide rail 40.

Figure 3A:
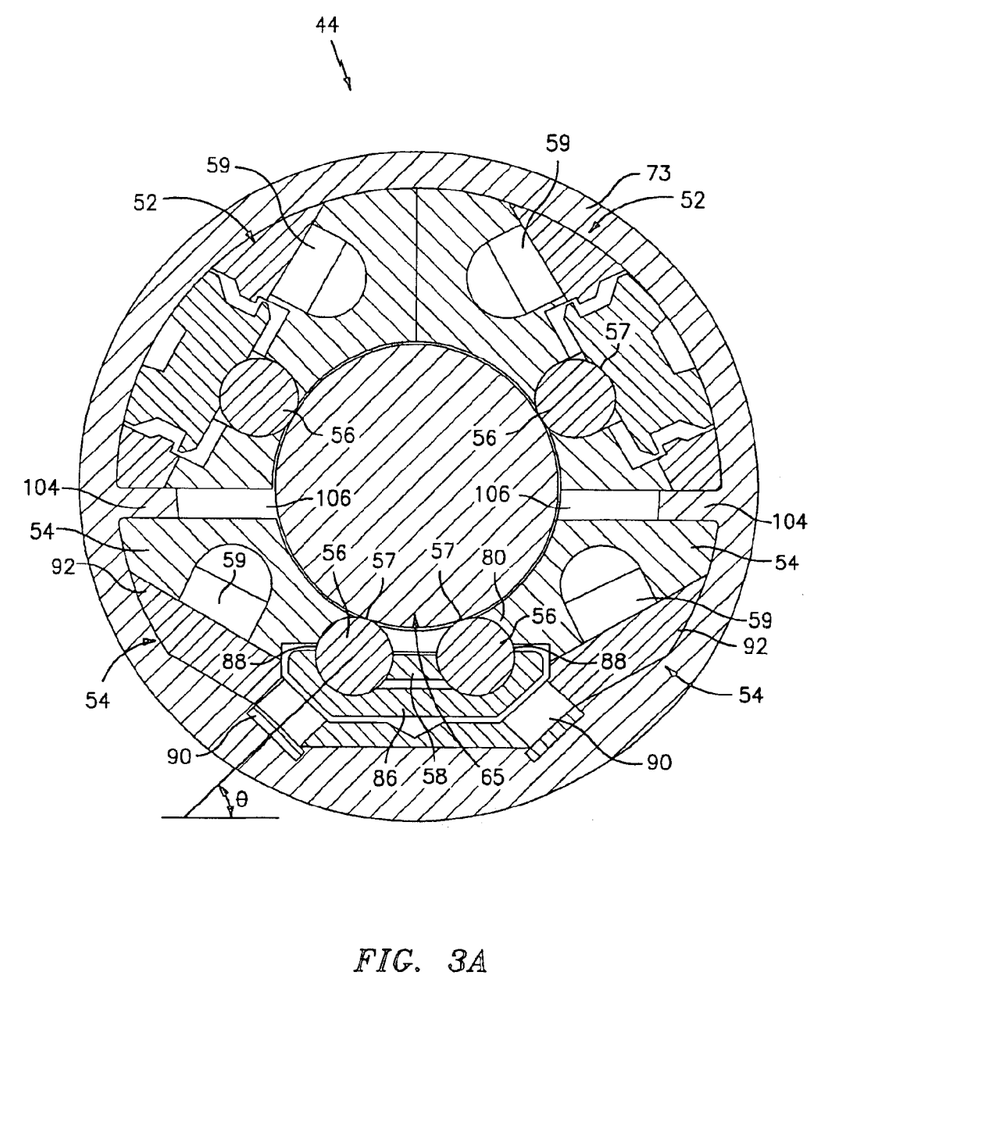
FIG. 3A is a transverse cross-sectional view of the sliding compound miter/chop saw taken along lines III—III of FIG. 2.
Figures 3B, 3C, 4A:
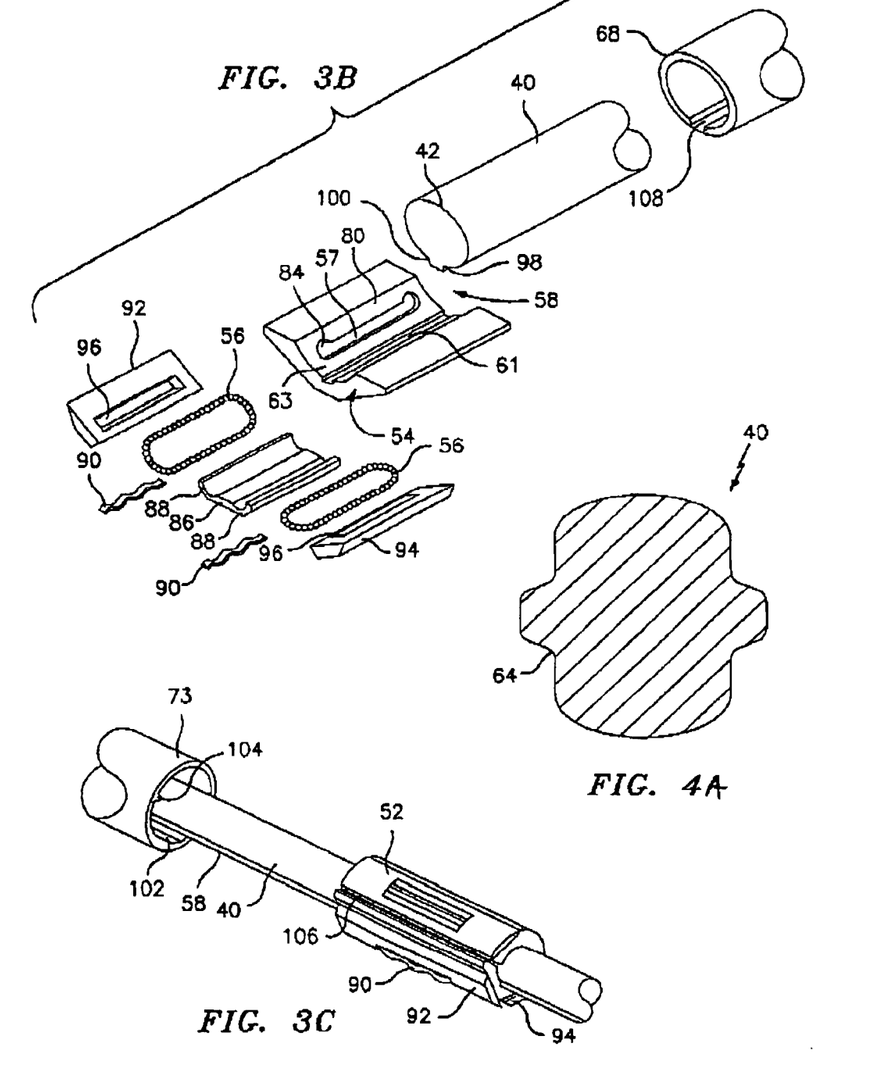

In particular, as shown in FIGS. 3A–3C, the inner surface of the end 73 of the saw housing 38 has radial ribs 104 extending into clearances 106 which are formed between the quarter arcuate and half arcuate retainer segments 52 and 54. Such engagement provides fixed rotational contact between the saw housing 38 and the linear motion bearing segment assembly 44. The half arcuate retainer segment 54 is provided with a longitudinal recess 61 (FIG. 3B) having an inner surface extending complementary to opposite sides 100 and 98 of the spline 58. Furthermore, the opposite sides 98 and 100 of the spline 58 are pressed upon by the balls or rollers 56 which are pre-loaded due to a force applied by the biasing members 90 through the converging flats 88 of the load bearing plate 86. The pre-load being applied against opposite sides 98 and 100 of the spline 58 at an angle "θ" (FIG. 3A) selected so that the spline 58 and the balls or rollers 56 preserve sliding contact therebetween.

To prevent angular displacement of the linear motion bearing segment assembly 44 and the saw housing 38 relative to the guide rail 40, the balls or rollers 56 abut the opposite sides 98 and 100 of the spline 58 such that the guide rail 40 and the balls 56 cannot be angularly displaced independently from one another. Particularly, the converging flats 88 of the load bearing plate 86, the ball bearing tracks 80 of the base portion 54 and the opposite sides 98 and 100 of the spline 58 are shaped to angularly support the balls or rollers 56, which circulate along the parallel load bearing portions 57, as shown in FIG. 3A. The balls or rollers 56 are this prevented from moving out of contact with the opposite sides 98 and 100 of the spline 58 during angular displacement of the saw housing 38 and the guide rail 40. Thus, any relative angular motion between the balls or rollers 56 and the rail guide 40 is substantially eliminated. As shown in FIG. 3A, a retaining member 65 above the load bearing plate 86 is placed in the recess 61 to provide additional lateral support for the balls 56 running along both load bearing portions 57.

Figure 4B:
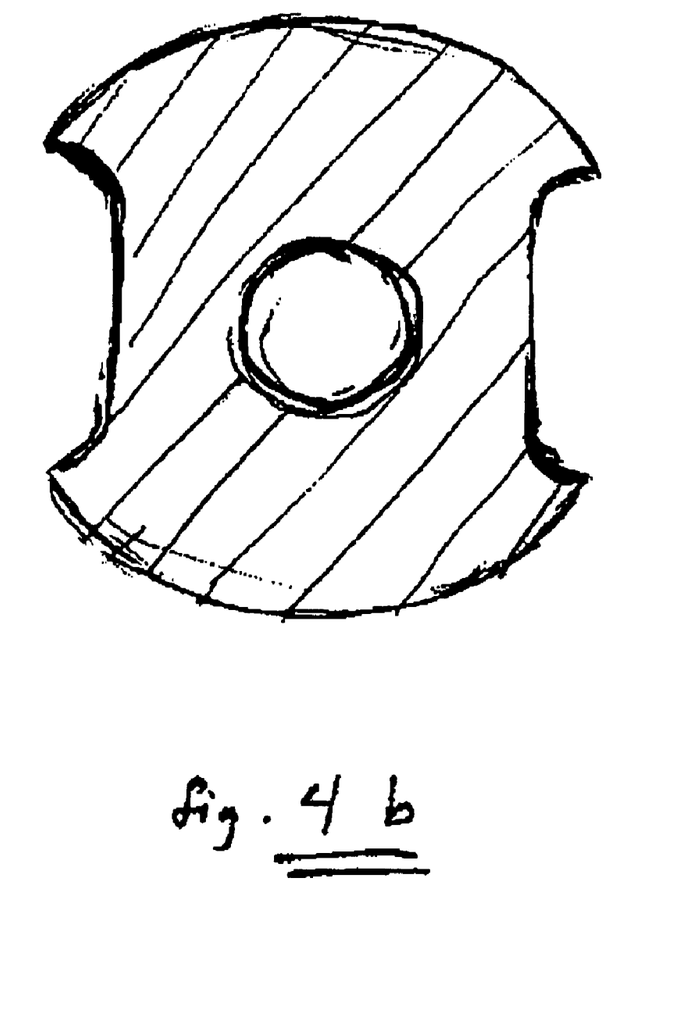
FIG. 4B is a diagrammatic cross-sectional view of a further alternative embodiment of the guide rail in accordance with the invention.
Figure 5:
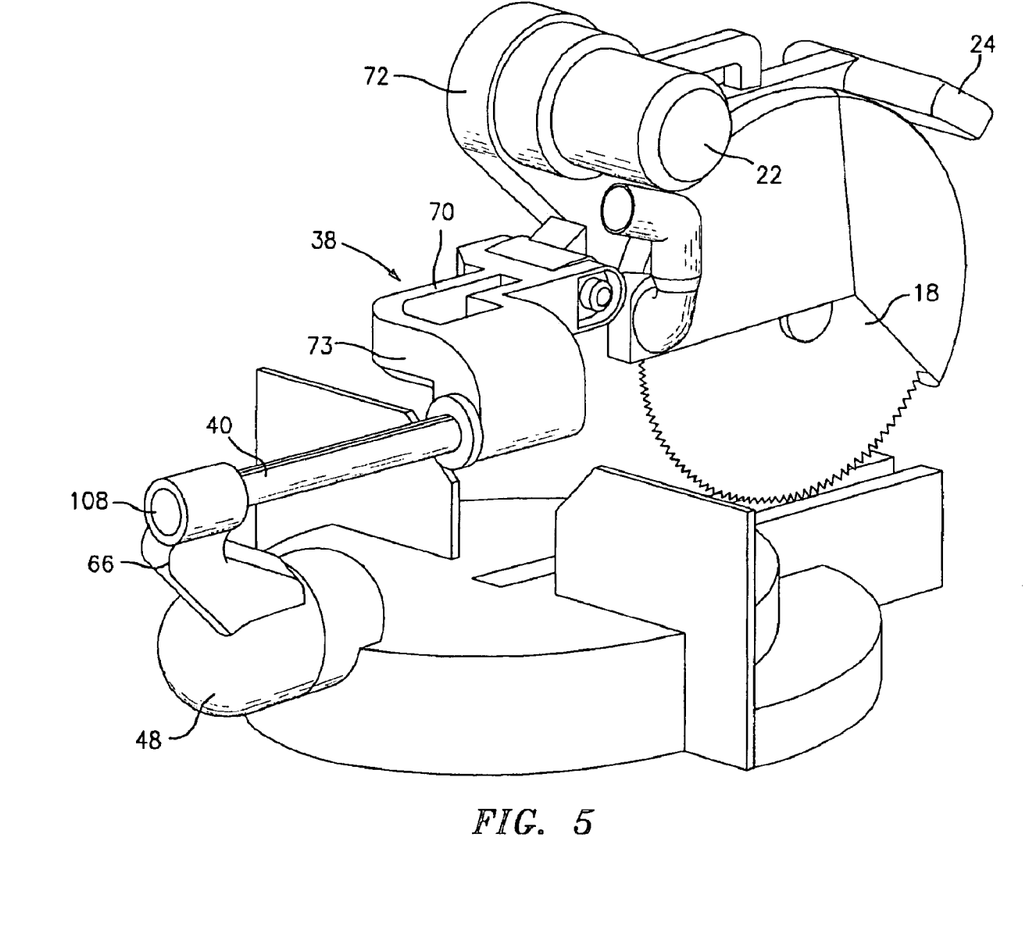
FIG. 5 is a perspective view of the sliding compound miter/chop saw shown in FIG. 2 and illustrated in an extended position of the miter saw.

Note that the number of the rolling element retainer segment and their cross-section, as well as the number of the splines can vary depending on a load and a shape of the guide rail 40. It is essential, however, that the guide rail 40 rotationally engage the linear motion bearing segment assembly 44 and the saw housing 38 in such a manner as to minimize a possibility of voluntary angular displacement of the saw housing about the rail guide 40. Thus, for example, FIG. 4 illustrates the guide rail 40 provided with a plurality of cutouts 64 which are spaced circumferentially apart and form respective ball loading bearing tracks receiving the rollers or balls 56 of the linear motion bearing assembly 44. Although the geometry of the guide rail 40 of FIG. 4 has a cross-like shape, this embodiment operates in a manner similar to the one described immediately above.

Thus, in response to an external torque, a mechanical link is created between the saw housing 38, the linear motion bearing assembly 44, the guide rail 40, the guide rail housing 68, the arm 66 and the rotatable joint 48, which pivot synchronously about the axis A—A axis in a substantially play-free manner. As a result of the described kinematics, the housing 38 can be displaced into a desired angled or beveled position of the blade 18 in a manner preventing the saw housing 38 from undesired torsional motion relative to the guide rail 40. Also, the inventive structure avoids drag even when the saw housing 38, the guide rail 40, and the guide rail housing 68 are displaced into a 45° angled position of the blade 18.

Figure 7:
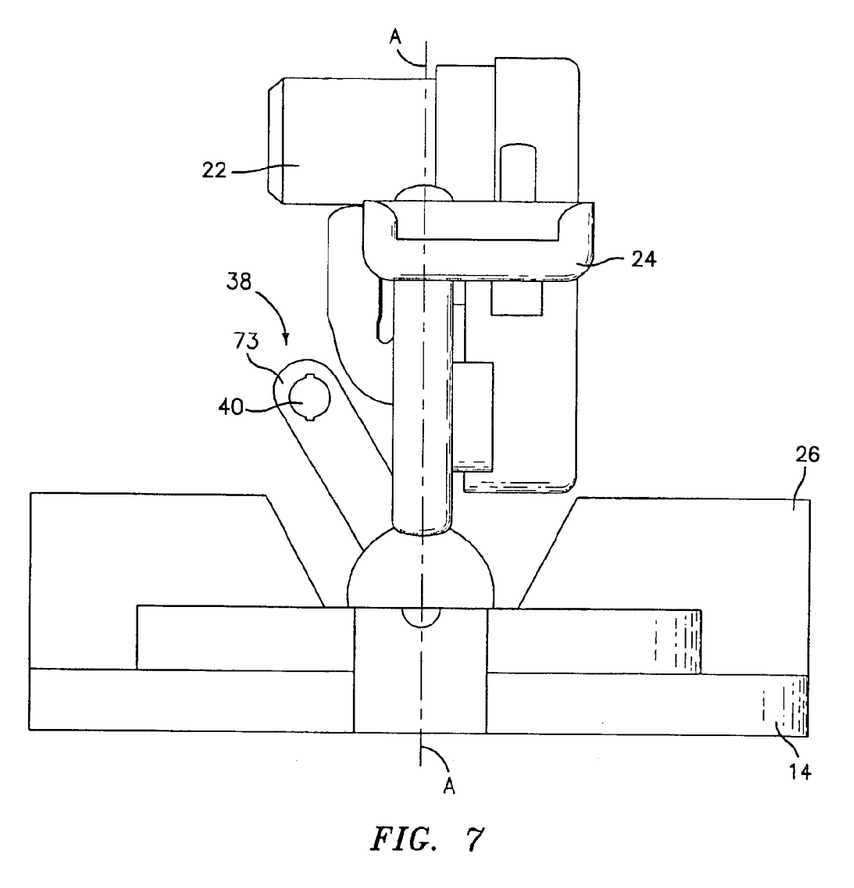
FIG. 7 is a front elevational view of the compound miter/chop saw shown in FIG. 2.

The Z-shaped lever 70 of the saw housing 38 (FIGS. 2, 5 and 6) positions the rail guide 40 so that the latter is laterally offset from a vertical axis B—B of the table assembly 14 when it is in a normal, vertical position, as shown in FIG. 7. As a result of such a shape of the lever 70, clearance for the guard plates 26 is always provided regardless of whether the saw housing 38 rotates clockwise or counterclockwise.

A combination of the guide rail 40 and the bearing segment assembly 44 can be successfully utilized in any portable power tool provided with rotatably meshing parts. Such a portable tool can included, but limited to, routers, plate joiners, and different types of drill presses, coping and dig saws. Thus, while the invention has been particularly shown and described with reference to the preferred embodiments, it will be understood that various modifications and changes in form and detail may be made therein without departing from the scope and spirit of the invention as defined in the following claims.

What is claimed is:

1. A saw comprising:
a table having an elongated axis;
a rotary joint fixed to the table and rotatable about the elongated axis in response to an external torque;
a longitudinally extending guide rail spaced radially from the elongate axis and fixed to the rotary joint to pivot with respect to the elongated axis during rotation of the rotary joint,
the guide rail having a shape selected from the group consisting of an annular cross-section, cross-shaped cross-section, I-beam cross-section, regular polygonal cross-section and an irregular polygonal cross-section;
a saw housing receiving a saw blade and mounted on the guide rail; and
a linear motion bearing assembly mounted between the guide rail and the saw housing and rotationally fixed to the housing to provide linear displacement of the saw housing along the guide rail,
the linear motion bearing assembly and the guide rail being shaped and dimensioned to prevent rotational movement relative to one another during angular displacement of the saw housing between beveled positions of the saw blade,
wherein the saw housing has a lever provided with opposite ends, one end of the lever having a bore receiving the linear motion bearing assembly, and the other end of the lever being coupled to the saw blade rotatable about a saw axis which extends transversely to the elongated axis.

2. The saw as claimed in claim 1, wherein the lever of the saw housing has a Z shape to maintain the clearance for the guard plates as the housing and the guide rail are displaceable between the beveled positions of the saw blade.

3. The saw as claimed in claim 1, wherein the bore has a plurality of spaced ribs extending radially inwards to engage the linear motion bearing assembly so that the saw housing and the linear motion bearing assembly are fixed to prevent rotational movement relative to one another.

4. The saw as claimed in claim 3, wherein the linear motion bearing assembly has a plurality of individual self-contained rolling element retainer segments spaced angularly apart from one another so that the spaced ribs of the lever are juxtaposed with and in contact with adjacent self-contained rolling element retainer segments to provide fixed rotational engagement between the linear motion bearing assembly and the saw housing.

5. The saw as claimed in claim 4, wherein at least one of the individual self-contained rolling element retainer segments has an axially extending base portion juxtaposed with the guide rail and being provided with a plurality of independent rolling element bearing tracks receiving a plurality of rolling elements and having a respective load bearing portion juxtaposed with the guide rail and a respective return portion, which are in rolling element communication with one another for circulating the rolling elements along the ball bearing track as the saw housing moves along the elongated axis, the load bearing portions being spaced apart so that when an external torque is applied to the saw housing, the rolling elements and the guide rail engage one in a rotationally fixed relationship.

6. The saw as claimed in claim 5, wherein at least one self-contained rolling element retainer segment has a longitudinally extending recess extending laterally between the load bearing portions of the adjacent rolling element bearing tracks and radially juxtaposed with the spline, the longitudinally extending recess having an inner surface extending complementary to the opposite sides of the spline.

7. The saw as claimed in claim 5, further comprising a load bearing plate mounted between the saw housing and the guide rail so that the load bearing plate covers the ball bearing tracks, and a plurality of biasing members disposed between the load bearing plate and the saw housing and resiliently biasing the load bearing plate against the balls.

8. The saw as claimed in claim 5, wherein the guide rail has a longitudinally extending spline having opposite sides which are engageable by the rolling elements guided along the load bearing portions in the rotationally fixed relationship.

9. The saw as claimed in claim 8, further comprising a guide rail housing fixed to the rotary joint and receiving an end of the guide rail, the guide rail housing having a nest provided with an inner surface which extends complementary to an outer surface of the spline of the guide rail and is dimensioned to be rotationally fixed therewith.

* * * * *